UNITED STATES PATENT OFFICE.

AUGUST J. METZLER, OF BROOKLYN, ASSIGNOR TO C. C. PUFFER, OF ROCHESTER, NEW YORK.

PROCESS OF MANUFACTURING BEER.

SPECIFICATION forming part of Letters Patent No. 436,536, dated September 16, 1890.

Application filed December 31, 1888. Serial No. 295,076. (No specimens.)

*To all whom it may concern:*

Be it known that I, AUGUST J. METZLER, a citizen of the United States, residing at Brooklyn, county of Kings, State of New York, have invented a certain new and useful Improvement in the Process of Manufacturing Beer; and I declare the following to be a full, clear, and exact description of the invention, such as will enable others skilled in the art to which it pertains to make and use the same.

Heretofore two principal processes have been employed in the manufacture of beer. By the first process the beer was run off from the fermenting-tubs into ruh-casks, where, with open bungs, it was permitted to rest for many weeks, or even months, in order to take on those characteristics known as "ripening or aging." When sufficiently ripened, however, it was flat. To give it the life requisite for the market, the casks were then bunged up, and in the course of a long time, frequently months, the incipient fermentation would accumulate sufficient pressure of carbonic-acid gas to enliven it, and it was ready for the market. This required very large storage capacity, and in the long period consumed the beer was liable to take on putrid flavors or odors, due to impurities about the cellars or in the casks or to chemical changes in foreign matters incorporated with the beer ingredients. This has been followed in late years by a process for shortening the period required to prepare the ripened ruh-beer for the market. To this end the ripened ruh-beer was drawn off into shavings-casks. Here was added to it about seven to twenty-five per cent., more or less, of young beer, or "kraeusen," as it is called, fresh from the fermenting-tubs. This instituted a violent fermentation and either at the same time with the kraeusen or after the violence of the fermentation had subsided finings were added and the casks were bunged up. The gas quickly generated a pressure, which was maintained by suitable vent-bung or bunging apparatus at about seven pounds, more or less, until in a period of ten to twenty days the beer was clarified and ready for the market. This greatly shortened the period of preparing the ruh-beer for the market, but speed was gained at the expense of quality, for the kraeusen detracted to just that extent from the "age" or "ripeness" of the ruh-beer. More recently still the ruh stage has been greatly shortened by maintaing the beer while in the ruh-casks under a partial vacuum, whereby it has in the space of a short time— seven to ten days, more or less—taken on the characteristics of age or ripeness, after which it was prepared for market by the use of kraeusen in shavings-casks, as above explained.

My present invention may be regarded as an improvement on this last-named process, and may be described as follows: The beer is run into the ruh-casks and maintained under a partial vacuum, as above explained. In this condition it soon parts with all its air or free oxygen, and stands, as it were, in the nature of a squeezed sponge, ready to absorb again whenever the opportunity is afforded. Now when the ruh-beer has reached its aged or ripened condition, I relieve the vacuum with carbonic-acid gas and continue the introduction of carbonic acid until the gas-pressure is sufficient to give to the beer the requisite or desired amount of life. At a suitable time, and preferably shortly before or shortly after the pressure is applied as last explained, I add to the beer saccharine matter, preferably in the form of liquid or solution, in the proportion of two quarts of the solution, more or less, to each barrel of the beer, depending on the condition, and may also add a small proportion of yeast in the quantity, say, of about two to three per cent. of the saccharine matter. This will excite a mild fermentation, which soon subsides, and under the pressure of gas leaves the beer clear and bright, but imparts to it the elements necessary to maintain its body and to insure its lasting qualities. Should the ruh-beer possess enough yeast-germs, the addition of yeast may be dispensed with. So, also, should the character of the beer be such that under pressure it does not readily settle and clarify, finings may be introduced either with the saccharine or after the fermentation excited has partly subsided, and the process may be employed either with or without the shavings. I prefer to maintain the cellars at a low temperature throughout the process, and also to employ about eighteen inches of mercury vacuum, more or less, and to establish a pressure in the final stage, and maintain the same at about seven pounds, more or less; but all these conditions may be varied to meet the circumstances of any particular case. It will be observed that this process dispenses entirely with the use of kraeusen, or young beer, but provides the elements to give it lasting qualities by saccharine, which is added and without the effect experienced where kraeusen is added of detracting from the qualities of age or ripeness possessed by the ruh-beer that is being finished off for the market. I prefer to add the carbonic acid in the liquid form, although it may be in the liquid or gaseous form, and I prefer also to introduce it at the bottom of the cask; but this is not essential. The saccharine or saccharine and yeast may be introduced in any ordinary and convenient way—as, for instance, it may be put in liquid form into a close vessel connected by a pipe or valve with the cask. Then by opening the valve the contents will pass freely into the cask.

I would call attention to the fact that in another application, Serial No. 295,074, I describe and claim the employment of a vacuum in preparing ruh-beer for the market, wherein I introduce saccharine and permit the gas arising from the fermentation which it excites to relieve the vacuum and thereafter get an enlivening pressure from this source or by the admission of gas from the exterior. So, also, in another application, Serial No. 295,077, I describe and claim the employment of a vacuum on the ruh-beer, its relief by the introduction of carbonic-acid gas, and the continuation of the admission of the carbonic-acid gas after the vacuum has been filled for imparting an enlivening pressure; also, in my application, Serial No. 295,075, I describe and claim a process for making ruh-beer in which a vacuum is maintained thereon, then relieved by carbonic-acid gas and the gas added until an enlivening pressure is had and so held.

What I claim is—

1. The process of manufacturing beer, the same consisting in maintaining the ruh-beer under a partial vacuum until ripened, then relieving the vacuum by carbonic-acid gas, and continuing the addition of carbonic acid until a gas-pressure is accumulated sufficient to give the desired life to the beer, and adding to the beer shortly before or after pressure is applied a small proportion of saccharine matter, substantially as described.

2. The process of manufacturing beer, the same consisting in maintaining the ruh-beer under a partial vacuum until ripened, then relieving the vacuum with carbonic-acid gas, and continuing the addition of carbonic acid until a sufficient pressure is accumulated to impart the desired life to the beer, and adding to the beer shortly before or after the pressure is applied a small proportion of saccharine matter and yeast, substantially as described, with or without finings and shavings and maintaining the pressure until settled and clear, substantially as described.

In testimony whereof I sign this specification in the presence of two witnesses.

AUGUST J. METZLER.

Witnesses:
WASH. L. JAQUES,
C. C. PUFFER.